United States Patent
Ryu et al.

(10) Patent No.: US 7,830,538 B2
(45) Date of Patent: Nov. 9, 2010

(54) METHOD OF PROVIDING MULTIMEDIA DATA FOR DIRECT PRINTING, DIRECT PRINTING METHOD AND APPARATUS THEREOF

(75) Inventors: Seok Ryu, Suwon-si (KR); Kwang-chul Lee, Suwon-si (KR); Eun-hee Rhim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1035 days.

(21) Appl. No.: 11/127,243

(22) Filed: May 12, 2005

(65) Prior Publication Data

US 2005/0254069 A1 Nov. 17, 2005

(30) Foreign Application Priority Data

May 12, 2004 (KR) .................. 10-2004-0033534
Jul. 28, 2004 (KR) .................. 10-2004-0059350

(51) Int. Cl.
*G06F 15/00* (2006.01)
(52) U.S. Cl. ............... 358/1.15; 358/1.1; 358/1.14; 358/1.16; 358/1.18; 709/203
(58) Field of Classification Search ........... 358/1.1, 358/1.9, 1.13, 1.15, 1.16, 1.18; 709/203
See application file for complete search history.

(56) References Cited

U.S. PATENT DOCUMENTS

| | | | |
|---|---|---|---|
| 6,104,886 A | | 8/2000 | Suzuki et al. |
| 7,605,938 B2* | | 10/2009 | Ryu et al. .......... 358/1.15 |
| 2003/0002081 A1* | | 1/2003 | Leone et al. ......... 358/1.18 |
| 2003/0058469 A1 | | 3/2003 | Buis et al. |
| 2003/0184789 A1 | | 10/2003 | Komaki |
| 2003/0227648 A1 | | 12/2003 | Oshima et al. |
| 2004/0034613 A1 | | 2/2004 | Purvis et al. |
| 2004/0066530 A1* | | 4/2004 | Wu et al. ............ 358/1.15 |
| 2004/0179103 A1* | | 9/2004 | Endo et al. .......... 348/207.2 |
| 2004/0179105 A1* | | 9/2004 | Endo et al. .......... 348/211.1 |
| 2004/0179221 A1* | | 9/2004 | Endo et al. .......... 358/1.13 |
| 2004/0184078 A1* | | 9/2004 | Endo et al. .......... 358/1.15 |
| 2004/0252335 A1* | | 12/2004 | Yano et al. .......... 358/1.15 |
| 2005/0134892 A1* | | 6/2005 | Goto et al. .......... 358/1.13 |

(Continued)

FOREIGN PATENT DOCUMENTS

JP 2000-333123 A 11/2000

(Continued)

*Primary Examiner*—Twyler L Haskins
*Assistant Examiner*—Kent Yip
(74) *Attorney, Agent, or Firm*—Sughrue Mion, PLLC (57) ABSTRACT

A method of providing multimedia data for direct printing and a direct printing method and apparatus are provided. The method of providing multimedia data for direct printing includes composing hyperlink information on image data to be printed by an image supplying apparatus and text using a predetermined markup language, transferring the markup document resulting from the composing to a printing apparatus directly connected with the image supplying apparatus via a predetermined interface for performing a direct printing job, and transferring the image data to the printing apparatus in response to a request from the printing apparatus. When a direct printing job from a photographing apparatus to a printing apparatus is performed, multimedia data including text and an image can be printed.

12 Claims, 9 Drawing Sheets

U.S. PATENT DOCUMENTS

2005/0141941 A1* 6/2005 Narusawa et al. ............. 400/76
2005/0254081 A1* 11/2005 Ryu et al. .................. 358/1.13

FOREIGN PATENT DOCUMENTS

| | | |
|---|---|---|
| JP | 2001-1574 A | 1/2001 |
| JP | 2001-78127 A | 3/2001 |
| JP | 2002-190937 A | 7/2002 |
| JP | 2002-358183 A | 12/2002 |
| JP | 2003-256154 A | 9/2003 |
| JP | 2004-013349 A | 1/2004 |
| JP | 2004-15234 A | 1/2004 |
| JP | 2004-58500 A | 2/2004 |
| JP | 2004-64740 A | 2/2004 |
| JP | 2004-66602 A | 3/2004 |
| JP | 2004066602 A | 3/2004 |
| JP | 2004-127133 A | 4/2004 |
| JP | 2004-167786 A | 6/2004 |
| KR | 2003-0079317 A | 10/2003 |
| KR | 10-2003-0095263 A | 12/2003 |
| KR | 10-2004-0004179 A | 1/2004 |
| KR | 10-2004-0049868 A | 6/2004 |
| RU | 2103710 C1 | 1/1998 |
| WO | 03/085510 A1 | 10/2003 |
| WO | WO 03085510 A1 * | 10/2003 |
| WO | 2004/013750 A1 | 2/2004 |
| WO | WO 2004013750 A1 * | 2/2004 |

* cited by examiner

FIG. 2

```
<?xml version="1.0" encoding="UTF-8"?>
<!DOCTYPE html PUBLIC "-//PWG//DTD XHTML-Print 1.0//EN"
    "http://www.pwg.org/xhtml-print/xhtml-print10.dtd">
<html xmlns="http://www.w3.org/1999/xhtml">
<head>
    <link rel="stylesheet" href="css/overlaySamsung.css" />
    <style>
        .smaller {font-size: 6pt; }
        div {font-size: 10pt; text-align: center; }
    </style>
</head>
<body>
    <div class="overallHagaki">
        <i class="smaller">0 1 2 3 4 5 6 7 8 9 0 1 2 3 4 5 6 7 8 9 0 1 2 3 4 5
6 7 8 9 0 1 </i> <br />
        <center> Welcome to MIPC's Test World <br /> </center>
        <div class="image1"> <img align=right src="images/ryuri.jpg"
class="image1" /> </div>
        <div class="sNatural"> <img align=right src="images/Frame_4x3.png"
class="sNatural" /> </div>
        <div class="image1_text"> <i color="0xFFFFFFF" class="smaller">
<font size=3 color=blue> <b> My nephew </b> </font> </i> <br /> </div>
    </div>
</body>
</html>
```

.overallHagaki {position: absolute; top: 0mm; width: 148.0mm; height: 100.0mm; top: 0mm; left: 0mm;}

.overallnormal {position: absolute; top: 0mm; width: 80.0mm; height: 60.0mm; top: 0mm; left: 0mm;}

.iNatural {position: absolute; width: 100%; height: 100%; }

.sNatural {position: absolute; width: 84mm; height:85mm; top:6mm; left:8mm}

.image1 {position: absolute; top:11mm; left:12mm}

.image1_text {color=white; position: absolute; overflow: hidden; text-align: center; top: 54% ; left: 35%; }

<CAPABILITY>
  <Quality=Draft, Normal, Fine>
  <PaperSize=L, 2L, Wallet, A4, Card, ···>
  <PaperType=Plain, Photo>
  <ImageType=Jpeg, BMP, ···>
  <Layout=PAPER SIZE/LAYOUT1, ··· , INDEX(NXM)>
  <Layout=L/Borderless, 1X1, 1X2, 2X2, INDEX(3X5)>
  <Layout=2L/Borderless, 1X1, 1X2, 2X2, INDEX(5X7)>
  ...
  <Layout=Card/Borderless, 1X1, 1X2, INDEX(2X3)>
  ...
  <Option>
    <Vender=AAA, BBB, CCC, ···>
    <Trimming=(X, Y, W, H)>
    ...
  </Option>
</CAPABILITY>

FIG. 7

<JOBSTART>
  <Quality=Normal>
  <PaperSize=L>     310
  <PaperType=Photo>
  <ImageType=Jpeg>    320
  <PrintStyle=Multimedia>
  <FileHandle=00001>    330
</JOBSTART>

METHOD OF PROVIDING MULTIMEDIA DATA FOR DIRECT PRINTING, DIRECT PRINTING METHOD AND APPARATUS THEREOF

CROSS-REFERENCE TO RELATED APPLICATIONS

This application claims priority from Korean Patent Application Nos. 10-2004-0033534 and 10-2004-0059350 filed on May 12, 2004 and Jul. 28, 2004, respectively, in the Korean Intellectual Property Office, the disclosures of which are incorporated herein by reference in their entirety.

BACKGROUND OF THE INVENTION

1. Field of the Invention

Apparatuses and methods consistent with the present invention relate to direct printing, and more particularly, to printing multimedia data including an image and text.

2. Description of the Related Art

Along with the recent proliferation of digital photographing apparatuses (hereinafter, individually referred to as a "photographing apparatus"), such as digital cameras or mobile phones having an incorporated digital camera capable of photographing an image and converting the photographed image into digital image data, there has been a corresponding development of a technology for printing an image composed of digital image data.

In general, in order to print an image composed of digital image data, the digital image data photographed by a photographing apparatus should be transferred to a printing relay apparatus, for example, a personal computer (PC). The printing relay apparatus to which the digital image data is transferred performs a series of image processing jobs for image printing, including determining the layout or resolution of an image to be printed according to user's preference. Then, a printing apparatus receives image information processed by the printing relay apparatus and printing conditions and performs printing.

However, in recent years, a technology for performing direct printing using a photographing apparatus and a printing apparatus without using a printing relay apparatus such as a PC, hereinafter referred to as "direct printing", has been developed. As a result, a user has become able to directly connect the photographing apparatus with the printing apparatus via a predetermined interface, for example, a universal serial bus (USB) interface, thereby directly printing an image stored in the photographing apparatus by the printing apparatus.

While such a conventional direct printing technology has allowed image transfer and printing using the photographing apparatus and the printing apparatus, there still exists a need for a new direct printing technology for printing multimedia data including an image and text as well as an image according to user's preferences.

Korean Unexamined Patent Publication No. 2004-49868 entitled "Printing Apparatus, Control Method Therefor, and Storage Medium" discloses a direct printer which can be applied to a certain interface among a variety of interfaces including USB, IEEE 1394, and Bluetooth, and data pocket interfaces. However, this reference did not provide a teaching with regard to a direct printing technology for printing multimedia data including an image and text.

SUMMARY OF THE INVENTION

The present invention provides a direct printing method and apparatus for printing multimedia data including an image and text.

According to an aspect of the present invention, there is provided a method of providing multimedia for direct printing, the method including composing hyperlink information on image data to be printed by an image supplying apparatus and text using a predetermined markup language, transferring a markup document resulting from the composing to a printing apparatus directly connected with the image supplying apparatus via a predetermined interface for performing a direct printing job, and transferring the image data to the printing apparatus in response to a request from the printing apparatus.

According to another aspect of the present invention, there is provided a direct printing method including parsing a predetermined markup document received from an image supplying apparatus directly connected with a printing apparatus to perform a direct printing job, requesting image data indicated by hyperlink information on an image set in the markup document, and printing the image data received as a result of the requesting together with text included in the parsed markup document.

According to still another aspect of the present invention, there is provided an image supplying apparatus including an interface unit transferring and receiving data by connecting a printing apparatus via a predetermined interface to perform a direct printing job, an encoder composing hyperlink information on image data to be printed and text using a predetermined markup language, and a controller controlling transfer of the markup document resulting from the composing and the image data in response to a request from the printing apparatus.

According to yet another aspect of the present invention, there is provided a printing apparatus including an interface unit transferring and receiving data by connecting an image supplying apparatus via a predetermined interface to perform a direct printing job, a decoder parsing a predetermined markup document received from the image supplying apparatus, a controller requesting for image data indicated by hyperlink information on an image set in the markup document, and a printing unit printing the image data received in response to the request together with text included in the parsed markup document.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

In the present invention, an image supplying apparatus directly connects a printing apparatus via a predetermined interface, transfers image and text to be printed to the printing apparatus, thereby performing a direct printing job. Thus, an image memory apparatus, such as a personal digital assistant (PDA) or a mobile phone which can store image data, as well as a photographing apparatus, can serve as an image supplying apparatus.

In the following exemplary embodiments, the present invention will be described through a photographing apparatus as an example of an image supplying apparatus. However, the present invention is not limited to this, and other types of image supplying apparatuses can perform a direct printing job according to the present invention.

The present invention will now be described more fully with reference to the accompanying drawings, in which exemplary embodiments of the invention are shown.

Figure 1:
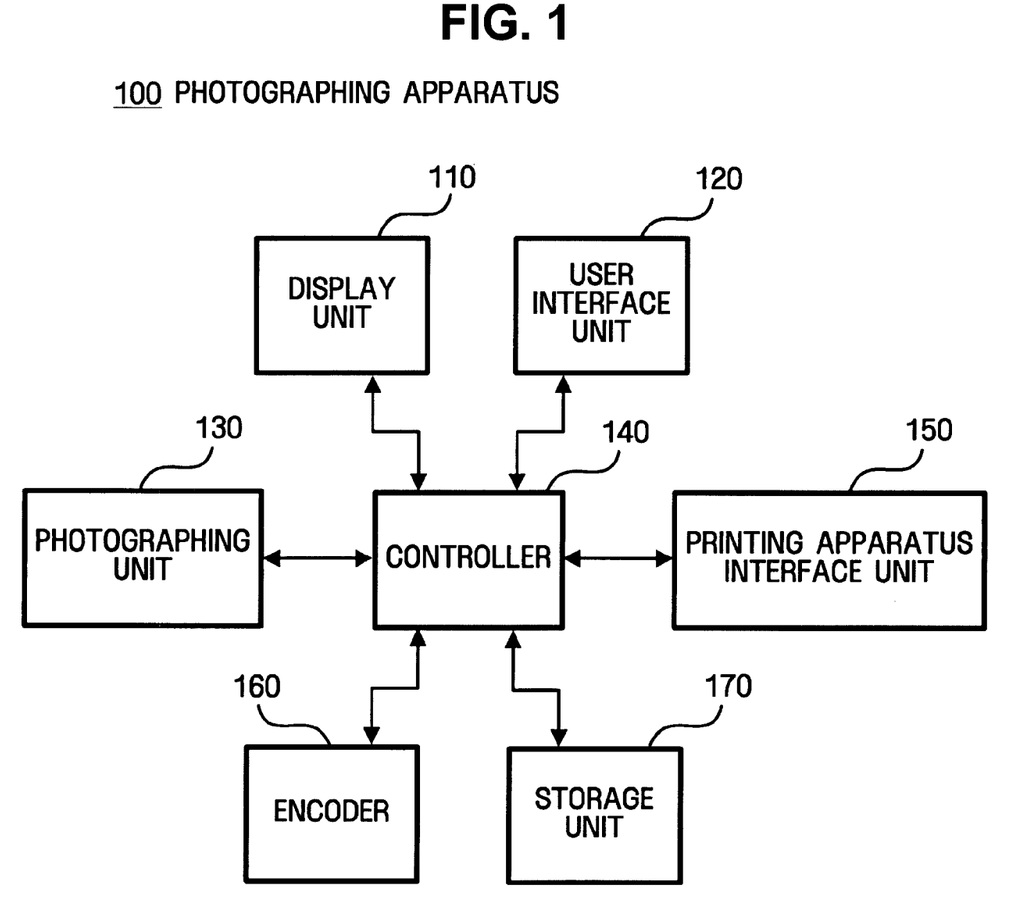
FIG. 1 is a block diagram of a photographing apparatus according to an exemplary embodiment of the present invention.

FIG. 1 is a block diagram of a photographing apparatus according to an exemplary embodiment of the present invention.

The photographing apparatus 100 shown in FIG. 1 includes a display unit 110 that displays a variety of photographing situations and printing status, a user interface unit 120 used in controlling the photographing apparatus 100, a photographing unit 130 that photographs an ambient image and generates digital image data, a controller 140 that controls overall operations of various functional blocks of the photographing apparatus 100, a printing apparatus interface unit 150 that connects the photographing apparatus 100 to a printing apparatus, an encoder 160 that composes a printing format of multimedia data using a predetermined markup language, and a storage unit 170 that stores image data, a composed markup document, or the like.

The display unit 110 displays photographing situations of the photographing apparatus 100, a photographed image, text, and the like input to the image by a user. In addition, when the photographing apparatus 100 connects the printing apparatus and performs a direct printing job, the display unit 110 displays printing conditions, printing progress, and the like. Thus, the user can check images and text to be printed and a direct printing procedure through the display unit 110.

The user interface unit 120 allows the user to control the photographing apparatus 100. Specifically, the user interface unit 120 may include a keypad, a touch screen and the like. Thus, the user can control the photographing apparatus through the user interface unit 120 and perform a variety of photographing jobs. The user can also input text to be printed together with the image photographed by the photographing unit 130 or stored in the storage unit 170 through the user interface unit 120. In addition, when the photographing apparatus 100 is connected to the printing apparatus and performs the direct printing job, the user can control a printing procedure like setting printing conditions through the user interface unit 120 or selecting an image to be printed.

The photographing unit 130 photographs an ambient image according to a user's control and converts the photographed image into digital image data. The digital image data is stored in the storage unit 170, and the image composed of the digital image data according to a user's preference may be displayed on the display unit 110.

The controller 140 controls the operation of each functional block of the photographing apparatus 100. In addition, the controller 140 generates and outputs a variety of commands or interprets the commands received from the printing apparatus to permit the photographing apparatus 100 to perform a direct printing job. When the direct printing job is performed, the variety of commands processed by the controller 140 will be described later with reference to FIGS. 5 through 8.

The printing apparatus interface unit 150 transfers the variety of commands or data output from the controller 140 to the printing apparatus or receives the commands or data transferred from the printing apparatus. The printing apparatus interface unit 150 may be connected to a wire interface such as a USB or IEEE 1394 interface, or to a wireless interface such as Bluetooth interface. The photographing apparatus 100 may be connected to the printing apparatus via the printing apparatus interface unit 150.

For example, when the photographing apparatus 100 is connected to a USB cable via the printing apparatus interface unit 150 and then is connected to the printing apparatus, the photographing apparatus 100 is a USB client and the printing apparatus is a USB host. Thus, the controller 140 of the photographing apparatus 100 serves as a storage server and a printer client for direct printing.

The controller 140 maps file identification information for identifying corresponding data to each data stored in the storage unit 170, such as image data or a markup document generated by the encoder 160. The file identification information may comply with an image transfer protocol between the photographing apparatus 100 and the printing apparatus. For example, when image data exchange between the photographing apparatus 100 and the printing apparatus is performed using Picture Transfer Protocol (PTP), i.e., "Picture Transfer Protocol for Digital Still Photography Devices", PIMA 15740:2000, Jul. 5, 2000, file identification information mapped to each data may be information on an object as file identification information used in PTP.

When the user controls the photographing apparatus 100 to print both the image and the text during direct printing, the encoder 160 composes hyperlink information on a corresponding image and text using a predetermined markup language. An example of a markup document composed by the encoder 160 is shown in FIG. 2.

Figure 2:
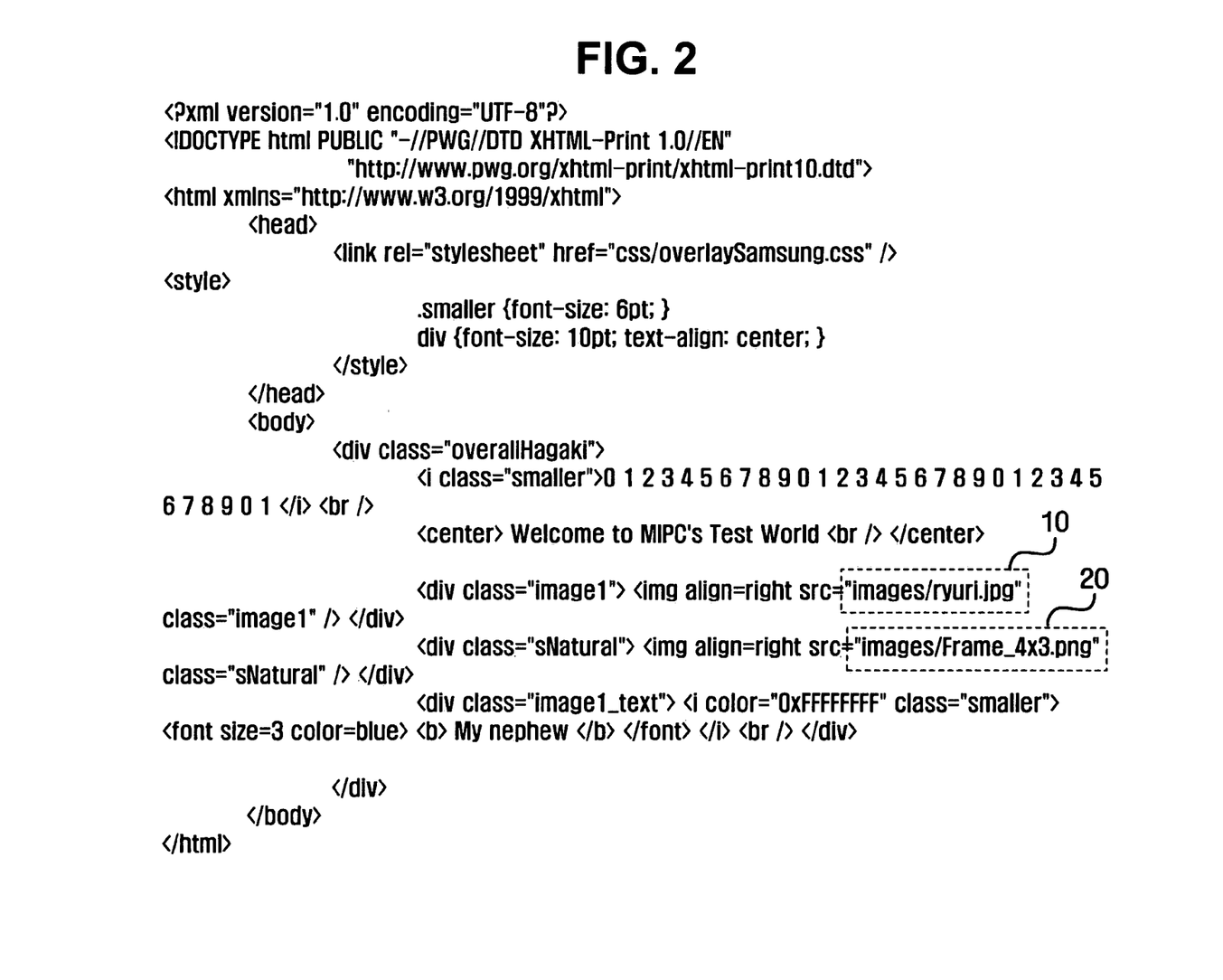
FIG. 2 illustrates a document in which a printing format of multimedia data including an image and text is written using Extensible Hypertext Markup Language (XHTML), according to an exemplary embodiment of the present invention.

FIG. 2 illustrates a document in which a printing format of multimedia data including an image and text is written using XHTML as an exemplary markup language, according to an exemplary embodiment of the present invention. As shown in FIG. 2, an image to be printed together with text can be obtained by hyperlink information such as "ryuri.jpg" 10 and "Frame_4×3.png" 20.

In this case, the hyperlink information of the image may be set to file identification information used in a data or image exchange protocol between the photographing apparatus 100 and the printing apparatus. For example, an image or data exchange between the photographing apparatus 100 and the printing apparatus is performed using a PTP, the hyperlink information of the image in the markup document can be replaced with file identification information (information on an object) instead of "ryuri.jpg" 10.

The storage unit 170 stores digital image data processed by the photographing unit 130, the markup document composed by the encoder 160, and so on. File identification information (hereinafter, referred to as a "file handle") used in the image or data exchange protocol between the photographing apparatus 100 and the printing apparatus may be mapped to each data stored in the storage unit 170. The file identification information may be set by the controller 140 or the printing apparatus.

Figure 3:
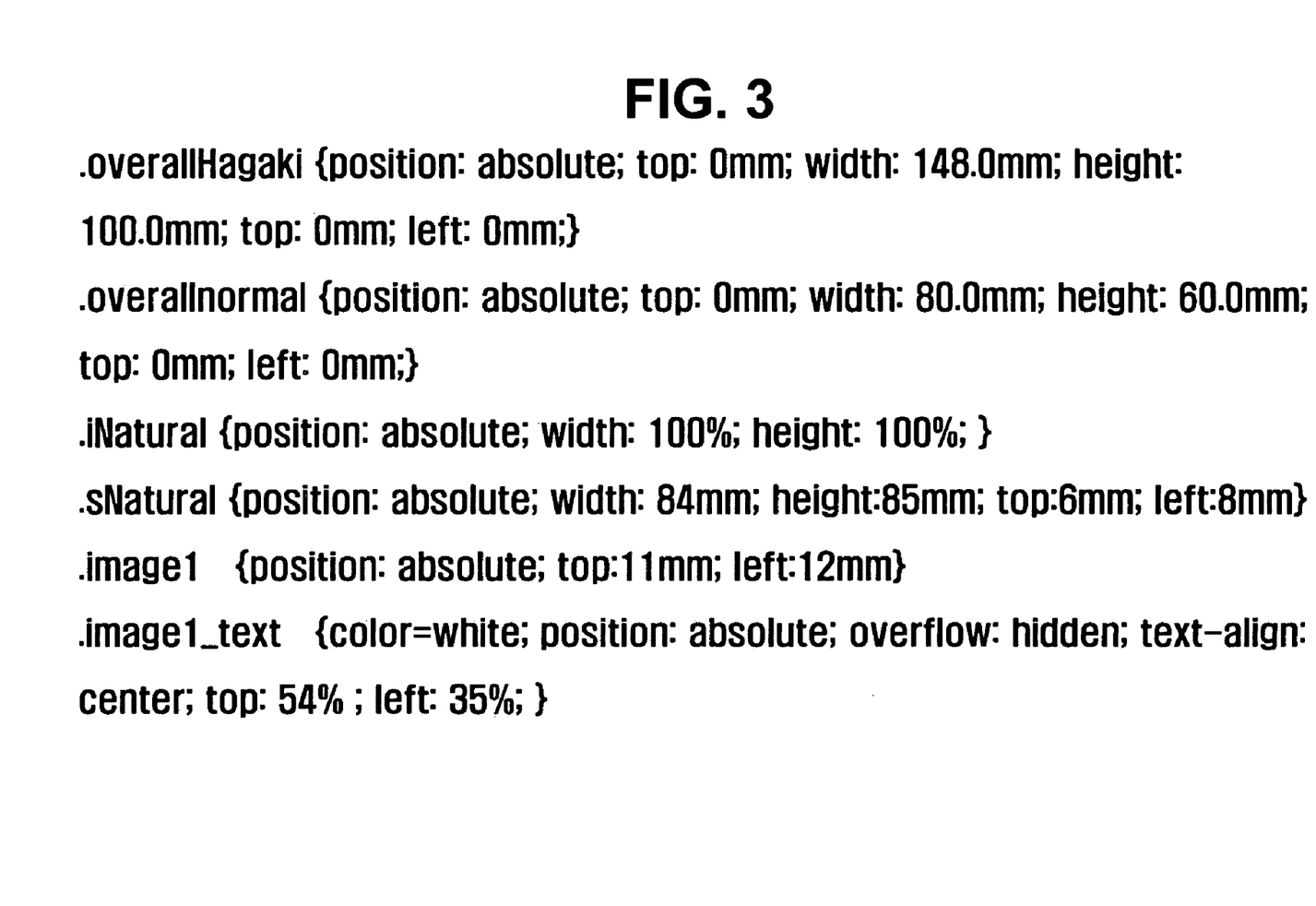
FIG. 3 illustrates an example of a style sheet for layout of an image and text to be printed.

When the user sets a layout for printing an image and text through the user interface unit 120, information on layout may be transferred to the printing apparatus. An example of a style sheet for layout is shown in FIG. 3. The controller 140 may compose the style sheet together with image hyperlink information and text using the encoder 160.

Figure 4:
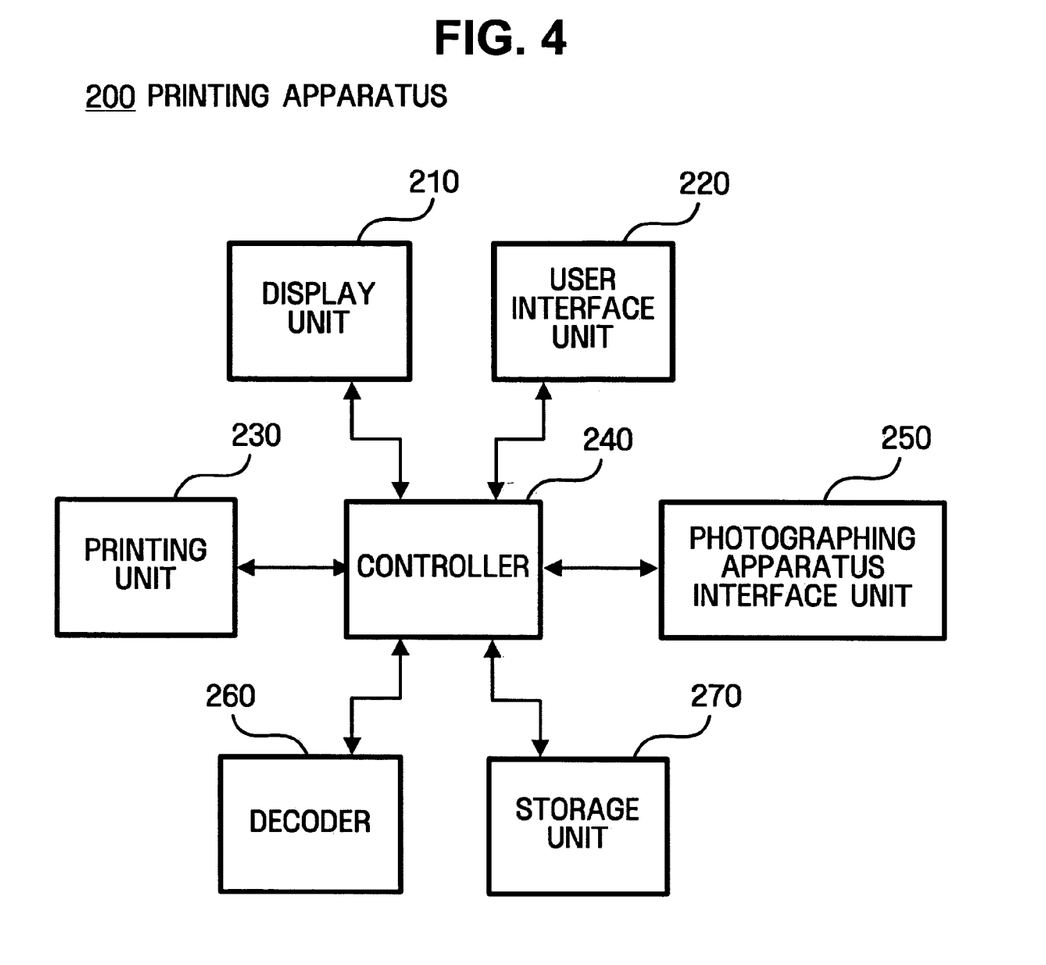
FIG. 4 is a block diagram of a printing apparatus according to an exemplary embodiment of the present invention.

FIG. 4 is a block diagram of a printing apparatus according to another exemplary embodiment of the present invention.

As shown in FIG. 4, the printing apparatus 200 includes a display unit 210 that displays printing status, a user interface unit 220 used in controlling the printing apparatus 200, a printing unit 230 that prints an object processed by the controller 240, a controller 240 that controls the operation of each functional block of the printing apparatus 200, a photographing apparatus interface unit 250 that connects the printing apparatus 200 to the photographing apparatus 100, a decoder 260 that parses a markup document received from the photographing apparatus 100, and a storage unit 170 that stores a description to be printed.

The display unit 210 displays a variety of photographing situations of the printing apparatus 200. A printing status for the case where the printing apparatus 200 is connected to the photographing apparatus 100 to perform a direct printing job may be displayed on the display unit 110 of the photographing apparatus 100. In this case, the display unit 210 of the printing apparatus 200 may display that the direct printing job is being performed.

However, the present invention is not limited to this, and even though the direct printing job is being performed, the display unit 210 may display printing conditions, statuses, or the like.

The user interface unit 220 allows the user to control the printing apparatus 200. Specifically, the user interface unit 220 may include a keypad or a touch screen. Thus, the user can set a variety of printing conditions, for example, quality, paper size, paper type, image type, or the like, through the user interface unit 220.

When the printing apparatus 200 is connected to the photographing apparatus 100 and performs a direct printing job, setting of the printing conditions may be controlled by the user interface unit 120 of the photographing apparatus 100. In this case, the user interface unit 220 of the printing apparatus 200 may not respond to a user's manipulation.

However, the present invention is not limited to this, and the user can control the printing apparatus 200 though the user interface unit 220. For example, the user can set printing conditions even when the direct printing job is being currently performed.

The printing unit 230 prints a target object to be printed, which has been finally processed by the controller 240, on printing paper.

The controller 240 controls the operation of each functional block of the printing apparatus 200. In addition, the controller 240 generates and provides a variety of commands or interprets the commands received from the photographing apparatus 100 so that the printing apparatus 200 can perform a direct printing job. When the direct printing job is performed, the commands processed by the controller 240 will be described later with reference to FIG. 5.

The controller 240 may also allow setting of printing conditions or displaying of printing status to be performed by the above-described photographing apparatus 100 during the direct printing job.

In addition, when the markup document received from the photographing apparatus 100 is parsed by the decoder 260, the controller 240 determines a printing format of multimedia data according to the parsing result and outputs printing information to the printing unit 230.

The photographing apparatus interface unit 250 transfers the commands or data output from the controller 240 to the photographing apparatus 100 or receives the commands or data transferred from the photographing apparatus 100. The photographing apparatus interface unit 250 may be connected to a wire interface such as a USB or IEEE 1394 interface, or to a wireless interface such as Bluetooth interface. The printing apparatus 200 may be connected to the photographing apparatus 100 through the photographing apparatus interface unit 250.

For example, when the printing apparatus 200 is connected to a USB cable via the photographing apparatus interface unit 250 and then is connected to the photographing apparatus 100, the photographing apparatus 100 is a USB client and the printing apparatus 200 is a USB host. Thus, the controller 240 of the printing apparatus 200 serves as a storage server and a printer client for direct printing.

The decoder 260 parses the markup document transferred from the photographing apparatus 100. Printing information on multimedia data including an image and text is included in the markup document. As such, the controller 240 can determine the printing format of the multimedia data.

The storage unit 270 stores a variety of data or printing information received from the photographing apparatus 100.

Figure 5:
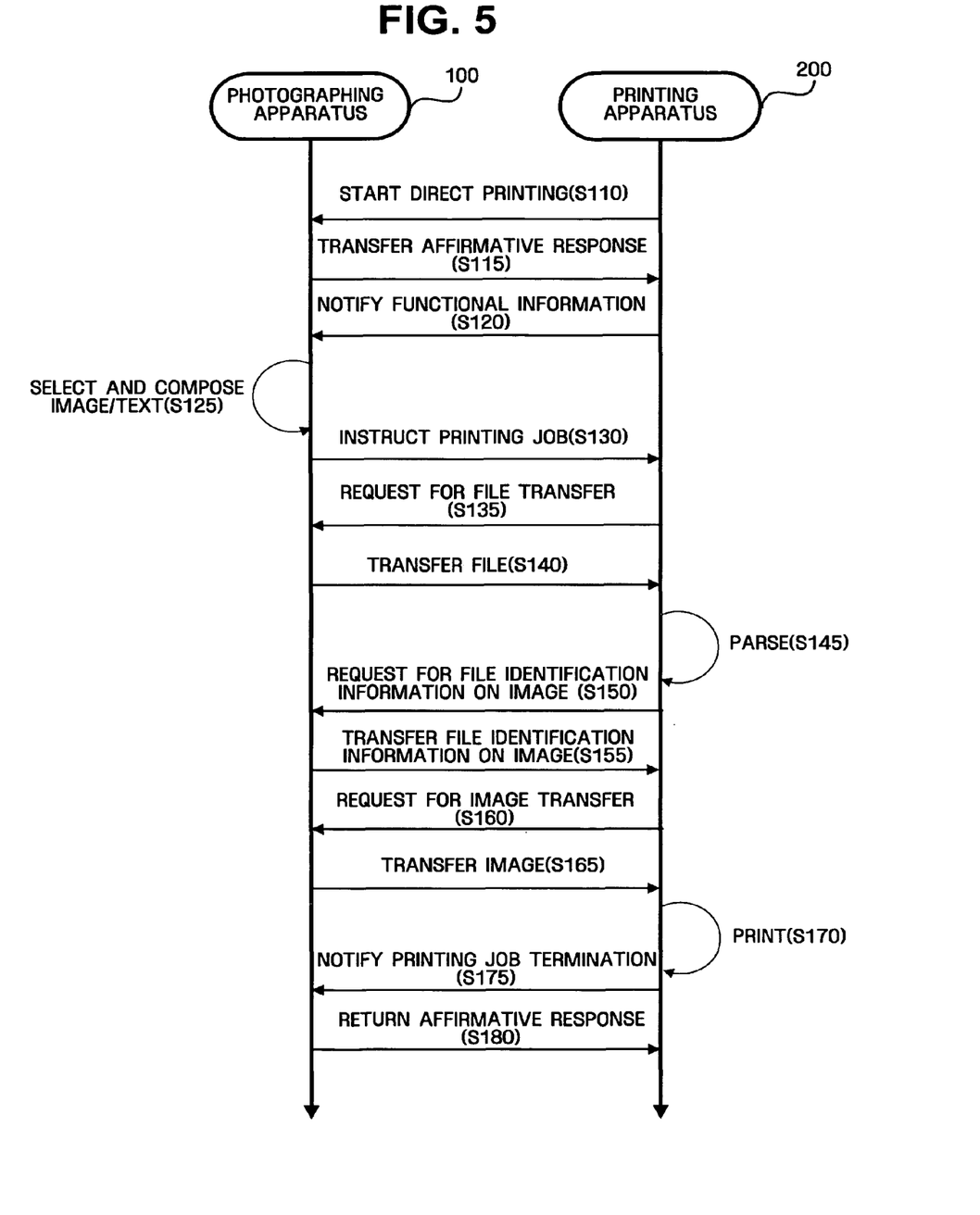
FIG. 5 is a flowchart illustrating communications between the photographing apparatus and the printing apparatus according to an exemplary embodiment of the present invention.

FIG. 5 is a flowchart illustrating communications between a photographing apparatus and a printing apparatus according to an exemplary embodiment of the present invention. Specifically, FIG. 5 illustrates a procedure of exchanging commands and data between the controller 140 of the photographing apparatus 100 and the controller 240 of the printing apparatus 200.

When the printing apparatus 200 and the photographing apparatus 100 are connected to each other via a predetermined interface, a direct printing application installed in the printing apparatus 200 and the photographing apparatus 100 is executed and a direct printing job is performed.

In operation S110, the printing apparatus 200 issues a direct printing start command to implement a direct printing mode. If the direct printing application is installed in the photographing apparatus 100, in operation S115, the photographing apparatus 100 transfers an affirmative response.

After receiving the affirmative response, the printing apparatus 200 notifies the photographing apparatus 100 of information on own functions in operation S120. The functional information may be transferred to the photographing apparatus 100 in a script format and an exemplary embodiment thereof is shown in FIG. 6.

Figure 6:
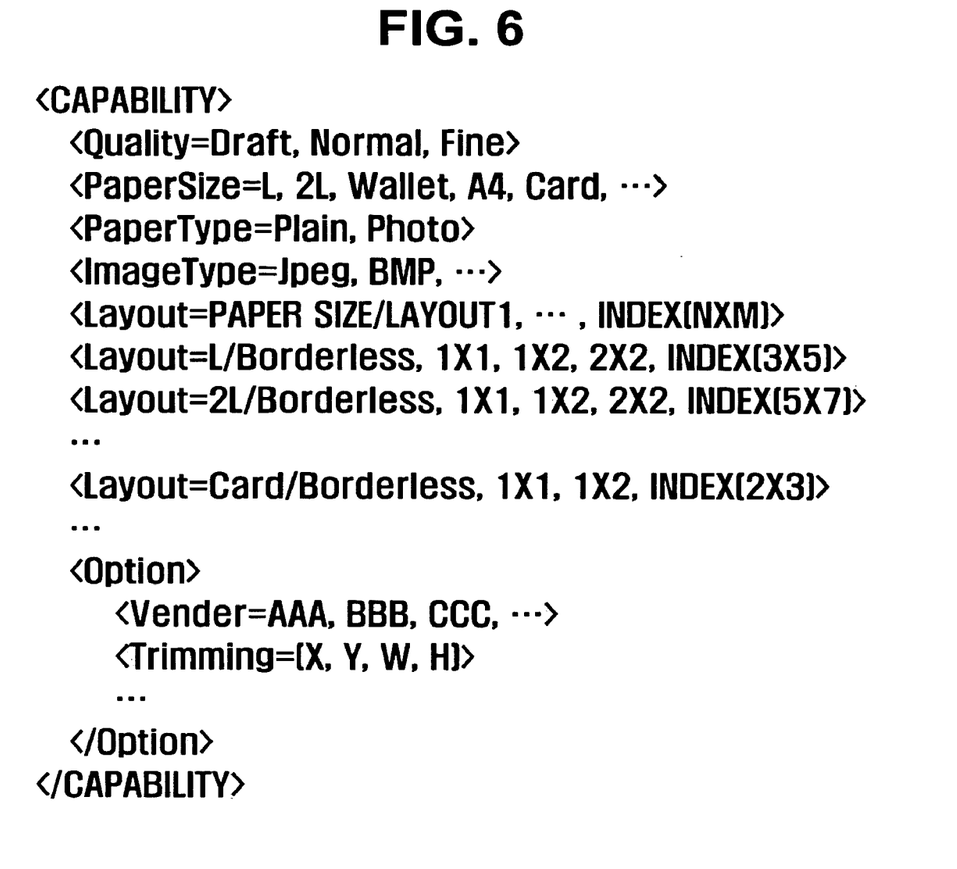
FIG. 6 illustrates functional information in a script format transferred by the printing apparatus according to an exemplary embodiment of the present invention.

As shown in FIG. 6, the functional information may include information on a variety of printing functions of the printing apparatus 200, such as paper type, paper size, quality, image type, layouts for specific paper size, or other options.

After receiving the functional information, the user of the photographing apparatus 100 determines whether printing is performed using any of functions of the printing apparatus 200 and selects an image and text to be printed in operation S125. In this case, the user can also determine the layout of the image and text to be printed. When the user desires to print the image with text, the photographing apparatus 100 can compose the printing format of multimedia including an image and text using a markup language, as described above. In this case, information on the layout set by the user can also be composed.

If the image and text to be printed are selected and printing conditions for the image and text are determined, in operation S130, the photographing apparatus 100 issues a printing job command to the printing apparatus 200.

When issuing the printing job command, the photographing apparatus 100 can also transfer printing conditions and file identification information mapped to the markup document resulting from the composing of operation S125. In this case, the file identification information may be file handle.

Figure 7:
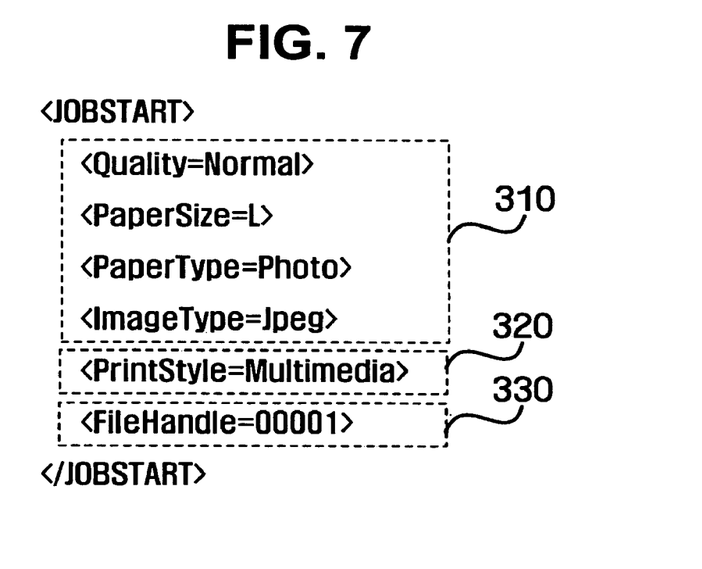
FIG. 7 illustrates printing job command JOBSTART in a script format according to an exemplary embodiment of the present invention.

An exemplary embodiment of printing job command JOB-START in a script format is shown in FIG. 7. As shown in FIG. 7, during printing job command, the photographing apparatus 100 can transfer printing conditions 310 determined by the user, such as quality, paper size, and file identification information 330 for identifying a file to be printed, such as file handle.

When issuing a printing job command, the photographing apparatus 100 can also transfer PrintStyle 320 which is information on a printing style. In the present invention, a printing style is information indicating whether only an image is to be printed or multimedia data including an image and text is to be printed. An example thereof is shown in Table 1.

TABLE 1

| Printing Style | Description of Printing Job |
|---|---|
| ImageOnly | Printing image only |
| Multimedia | Printing image with text |

The printing apparatus 200 can determine whether a file to be received for printing is digital image data or a markup document composed using a markup language, through the printing style. If the received file is a markup document, the controller 240 of the printing apparatus 200 can parse the received file using the decoder 260.

After receiving the printing job command, the printing apparatus 200 requests the photographing apparatus 100 to transfer a file to be printed using file identification information received together with the printing job command, in operation S135.

After receiving the file transfer request, the photographing apparatus 100 transfers the file mapped to the file identification information to the printing apparatus 200 in operation S140.

When the file transferred from the photographing apparatus 100 is a markup document, the printing apparatus 200 parses the file using the decoder 260 in operation S145.

The printing apparatus 200 can determine the printing format of the text and image from the parsed file. If the received markup document includes text to be printed and hyperlink information of the image to be printed, as shown in FIG. 3, the printing apparatus 200 requests the photographing apparatus 100 to transfer file identification information on an image to be printed using the hyperlink information of the image included in the markup document, in operation S150. In operation S155, the photographing apparatus 100 transfers file identification information of the image to be printed in response to the request from the printing apparatus 200. The file identification information may be a file handle, which has already been described above.

After receiving the file identification information on the image to be printed, if the printing apparatus 200 requests the photographing apparatus 100 to transfer an image to be printed using the received file identification information in operation S160, the photographing apparatus 100 transfers image data mapped to the corresponding file identification information in operation S165.

After receiving the image data from the photographing apparatus 100, the printing apparatus 200 prints the image and text according to the parsing result of operation S145, in operation S170.

If information on the layout of the image and text is not included in the markup document received by the printing apparatus 200, the printing apparatus 200 may obtain a style sheet on the layout by a method similar to that of obtaining image data. This is also applied to the following exemplary embodiments.

If hyperlink information on the image is set as file handle in the markup document received in operation S140, operations S150 and S155 may be omitted. In this case, in operation S160, the printing apparatus 200 can request the photographing apparatus 100 to transfer image data using hyperlink information on the image obtained after the parsing of operation S145.

If only an image is to be printed according to the printing job command (S130), for example, if the printing style is set to ImageOnly, operations S135 through S155 may be omitted. In this case, the printing apparatus 200 prints the image in the conventional manner.

If the printing job requested by the photographing apparatus 100 is terminated, in operation S175, the printing apparatus 200 notifies the photographing apparatus 100 of printing job termination, and in operation S180, the photographing apparatus 100 returns an affirmative response to the printing apparatus 200. In this manner, the printing job based on direct printing is completed.

If the markup document received from the photographing apparatus 100 includes hyperlink information on a plurality of images or identification information on another multimedia data, operations S135 through S165 are repeatedly performed so that the printing apparatus 200 can obtain image data and text required for printing.

Even when hyperlink information on an image and text to be printed are not composed using a markup language, the photographing apparatus 100 transfers the image and text in a manner similar to that described above for printing.

Communications between the photographing apparatus 100 and the printing apparatus 200 shown in FIG. 5 may be implemented to be in conformity with an image or data transfer protocol between the photographing apparatus 100 and the printing apparatus 200. In an exemplary embodiment of the present invention, exchanging data between the photographing apparatus 100 and the printing apparatus 200 using a PTP will now be described.

Figure 8:
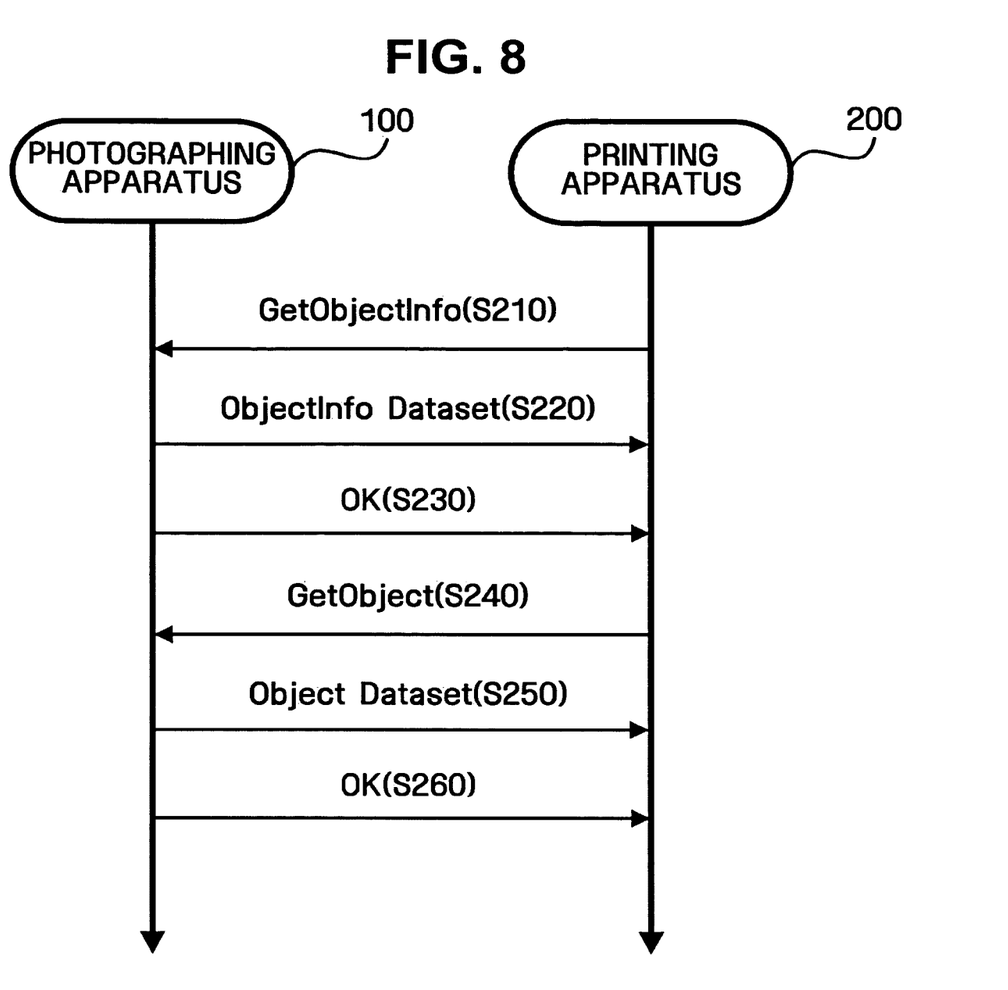
FIG. 8 is a flowchart illustrating a communication sequence in which the printing apparatus obtains a markup document from the photographing apparatus, implemented using a PTP architecture.

FIG. 8 is a flowchart illustrating a communication sequence in which the printing apparatus 200 obtains a markup document from the photographing apparatus 100, implemented using a PTP architecture.

In operation S210, the printing apparatus 200 requests the photographing apparatus 100 to transfer information (file identification information used in a PTP) on an object of document data stored in the photographing apparatus 100 through a GetObjectInfo command. In operation S220, the photographing apparatus 100 transfers ObjectInfo Dataset which is information on an object to the printing apparatus 200.

If the photographing apparatus 100 notifies the printing apparatus 200 that the photographing apparatus 100 is ready to perform a subsequent job, through an affirmative response, in operation S230, the printing apparatus 200 requests the photographing apparatus 100 to transfer an object (e.g., markup document) mapped to the object information obtained in operation S220, to the photographing apparatus 200 through a GetObject command.

In operation S250, the photographing apparatus 100 transfers Object Dataset (markup document in the present invention) mapped to the requested object information to the printing apparatus 200.

If the object information of the corresponding markup document is transferred during printing job command in operation S130, operations S210 through S230 may be skipped.

Likewise, operations S150 through S165 in which the printing apparatus 200 obtains image data from the photographing apparatus 100 to perform a printing job may be implemented using a PTP.

In addition, command and data transfer between the photographing apparatus 100 and the printing apparatus shown in FIG. 5 may also be implemented using a PTP, and a description of each operation is made in detail in Japanese Patent Laid-open Publication No. 16-064740 entitled "Printing System, Method for Controlling the Same and Photo Direct Printing Apparatus)". Thus, a description in which another communication sequence shown in FIG. 5 is implemented using a PTP will be omitted.

Figure 9:
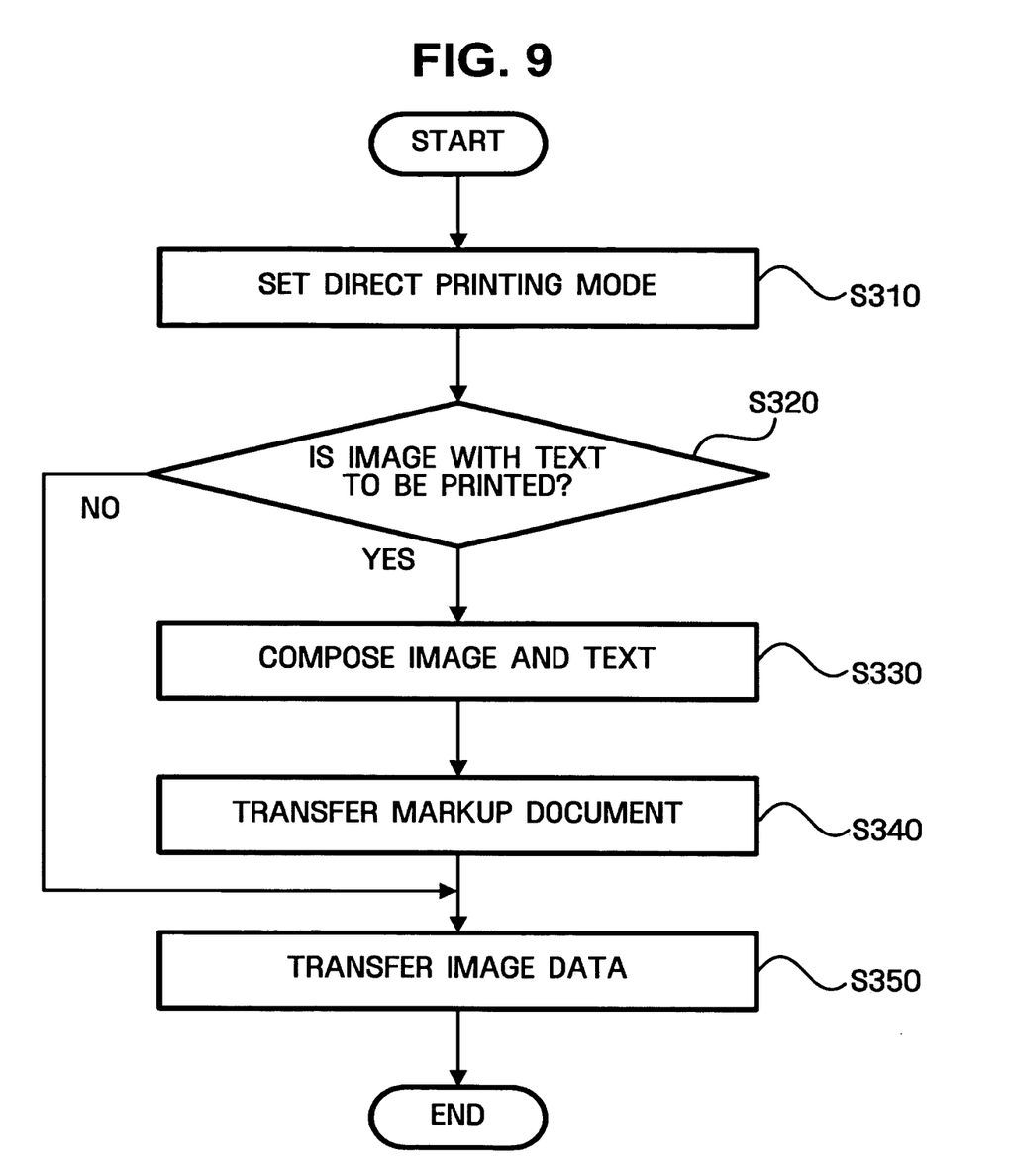
FIG. 9 is a flowchart illustrating the operation of the photographing apparatus according to an exemplary embodiment of the present invention.

FIG. 9 is a flowchart illustrating the operation of the photographing apparatus according to an exemplary embodiment of the present invention.

In operation S310, if the photographing apparatus 100 directly connects the printing apparatus 200 via a predetermined interface and is set to a direct printing mode, it is determined whether a user requests a printout of multimedia data in operation S320.

If a printout of multimedia data is requested, in operation S330, the encoder 160 of the photographing apparatus 100 composes hyperlink information of an image to be printed and text to be printed using a predetermined markup language. An example of the markup document composed by the encoder 160 has been described above with reference to FIG. 2.

If a markup document is generated, in operation S340, the photographing apparatus 100 transfers the markup document to the printing apparatus 200. If the printing apparatus 200 requests the photographing apparatus 100 to transfer an image to be printed using hyperlink information on an image included in the markup document, the photographing apparatus 100 transfers a corresponding image in operation S350.

If a printout of only an image is requested in operation S330, the photographing apparatus 200 can transfer an image using a direct printing method like in the prior art. Implementation of the direct printing job processed by the photographing apparatus 100 has already been described in detail with reference FIGS. 5 through 8.

Figure 10:
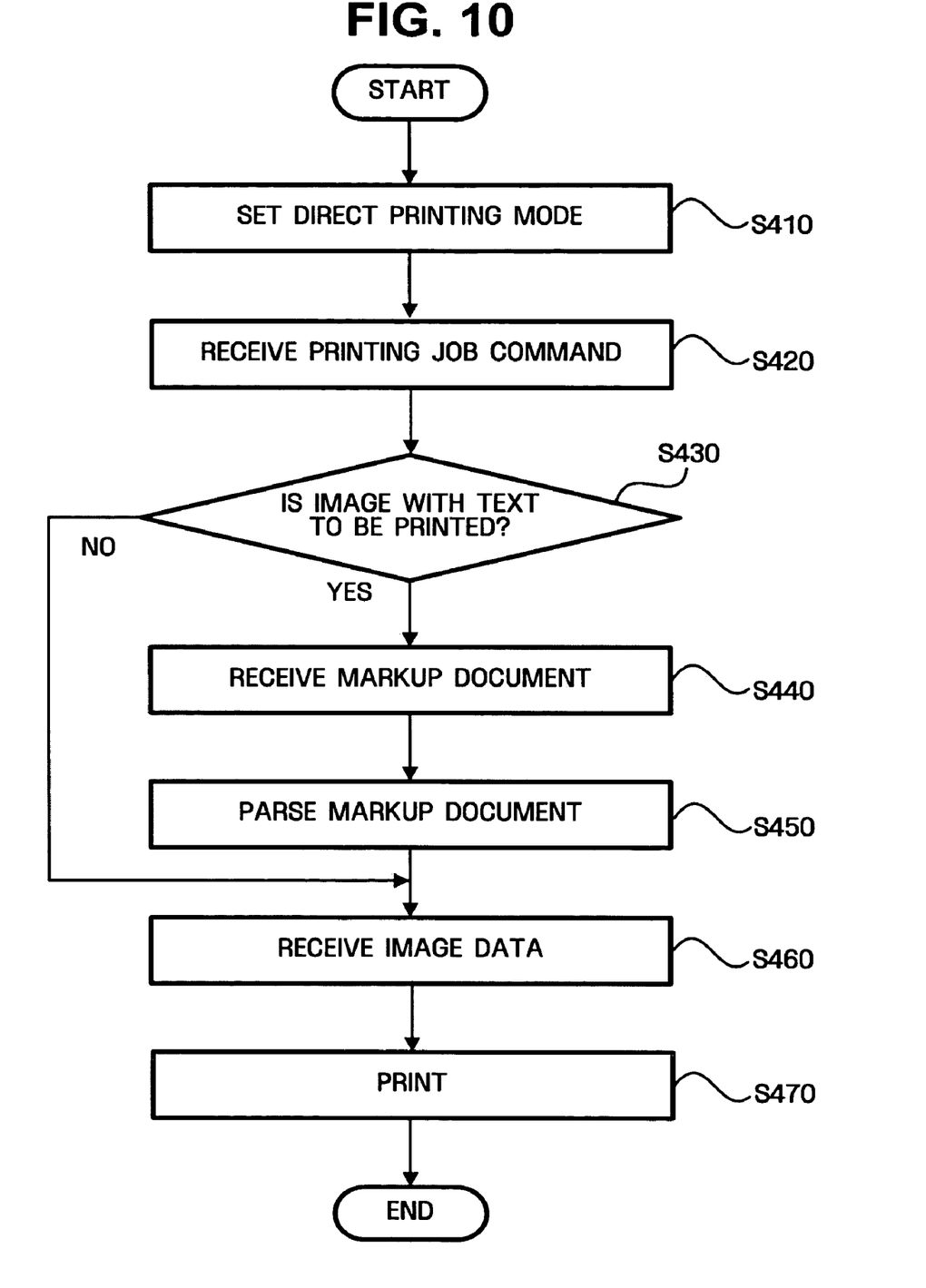
FIG. 10 is a flowchart illustrating the operation of the printing apparatus according to an exemplary embodiment of the present invention.

FIG. 10 is a flowchart illustrating the operation of a printing apparatus according to an exemplary embodiment of the present invention.

In operation S410, if the printing apparatus 200 directly connects the photographing apparatus 100 via a predetermined interface and is set to a direct printing mode and then receives a printing job command from the photographing apparatus 100 in operation S420, the printing apparatus 200 performs a direct printing job.

In operation S430, the printing apparatus 200 determines whether multimedia data is to be printed through the received printing job command.

If the printing job command to print the multimedia data is received, the printing apparatus 200 receives a markup document indicating a printing format of the multimedia data in operation S440 and parses the markup document using the decoder 260 in operation 450.

In operation S460, if the printing apparatus 200 requests the photographing apparatus 100 to transfer an image included in the parsed markup document using the hyperlink information on the image and receives image data thereof, the printing apparatus 200 prints the multimedia data according to the parsed result in operation S470.

If it is determined to print only an image in operation S430, the printing apparatus 200 can print the image using a conventional direct printing method. Implementation of the direct printing job processed by the printing apparatus 200 has already been described in detail with reference to FIGS. 5 through 8.

As described above, in the direct printing method and apparatus according to the present invention, when a direct printing job from a photographing apparatus to a printing apparatus is performed, multimedia data including text and an image can be printed.

While the certain specific exemplary embodiments of the invention have been described in detail, it will be understood by those of ordinary skill in the art that various changes in form and details may be made therein without departing from the spirit and scope of the present invention as defined by the following claims. Therefore, it is to be appreciated that the above described exemplary embodiments embodiment is are for purposes of illustration only and not to be construed as a limitation of the invention.

What is claimed is:

1. A method of providing data for a printing job, the method comprising:

transmitting a printing style comprising information indicating whether an image data is to be printed with text to a printing apparatus;

generating a first markup document comprising link information on the image data to be printed, information on a layout indicating printing formats of the image data, and information on the text to be printed, if the image data is to be printed with the text;

transmitting the generated first markup document to the printing apparatus via a predetermined interface, wherein the printing apparatus requests the first markup document if the printing style information indicates that the image data is to be printed with the text;

transferring file identification information related to the image data and text based on the information provided in the first markup document to the printing apparatus, in response to a request for the file identification information from the printing apparatus; and transmitting the image data and the text corresponding to the transferred file identification information to the printing apparatus in response to a request from the printing apparatus, wherein the layout is generated using a second markup document and the information on the layout is link information of the second markup document.

2. The method of claim 1, wherein the printing style information is inputted by a user.

3. The method of claim 1, wherein the printing style information indicates that only the image data is to be printed, the method further comprising:

omitting the generating the first markup document, the transmitting the generated first markup document, the transferring the file identification information, and the transmitting the image data and the text; and transmitting the image data to the printing apparatus.

4. A printing method comprising:

receiving a printing style comprising information indicating whether an image data is to be printed with text;

receiving a first markup document comprising link information on the image data to be printed, information on a layout indicating printing formats of the image data from a supplying apparatus, and information on the text to be printed, if the printing style information indicates that the image data is to be printed with the text;

receiving file identification information related to the image data and text based on the information provided in the first markup document, in response to a first request for the file identification information by a printing apparatus;

receiving the image data and the text corresponding to the received file identification information, in response to a second request for the image data and the text by the printing apparatus; and printing the received image data and text, wherein the layout is generated using a second markup document and the information on the layout is link information of the second markup document.

5. The method of claim 4, wherein the printing style information is inputted by a user.

6. The method of claim 4, wherein the printing style information indicates that only the image data is to be printed, the method further comprising:

omitting the receiving the first markup document, the file identification information, and the image data and the text;

receiving the image data; and printing the received image data.

7. A supplying apparatus comprising:

an encoder which generates a first markup document comprising link information on image data to be printed, information on a layout indicating printing formats of the image data, and information on text to be printed, when the image data is to be printed with the text;

an interface unit which transmits a printing style comprising information indicating whether the image data is to be printed with the text, and transmits the generated first markup document to the printing apparatus via a predetermined interface if the image data is to be printed with the text; and a controller which controls:

transfer of the first markup document in response to a request for the first markup document submitted by the printing apparatus if the printing style information indicates that the image data is to be printed with the text, transfer of file identification information identified by the information in the first markup document to the printing apparatus based on a request for the file identification information from the printing apparatus, and transfer of the image data and the text corresponding to the transferred file identification information to the printing apparatus based on a request from the printing apparatus, wherein the layout is generated using a second markup document and the information on the layout is link information of the second markup document.

8. The method of claim 7, wherein the printing style information is inputted by a user.

9. The apparatus of claim 7, wherein, if the printing style information indicates that only the image data is to be printed, the encoder does not generate the first markup document, and the controller transfers only the image data to the printing apparatus.

10. A printing apparatus comprising:

an interface unit which receives a printing style comprising information indicating whether an image data is to be printed with text, and receives a first markup document comprising link information on the image data to be printed, information on a layout indicating printing formats of the image data from a supplying apparatus and information on the text to be printed, wherein the first markup document is requested by the printing apparatus if the printing style information indicates that the image data is to be printed with the text;

a controller which requests and receives file identification information related to the image data and text identified in the information set in the first markup document, and the image data and text corresponding to the received file identification information; and a printing unit which prints the received image data and text, wherein the layout is generated using a second markup document and the information on the layout is link information of the second markup document.

11. The method of claim 10, wherein the printing style information is inputted by a user.

12. The apparatus of claim 10, wherein, if the printing style information indicates that only the image data is to be printed, the interface unit does not receive the first markup document, the controller requests and receives only the image data, and the printing unit prints the received image data.

* * * * *